July 26, 1966  H. OVERHOFF  3,262,168
PLASTIC MOLDING FASTENER
Filed July 29, 1964
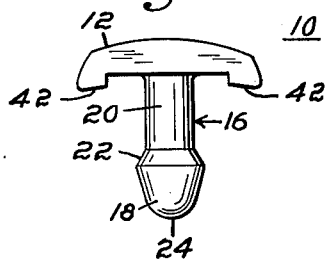
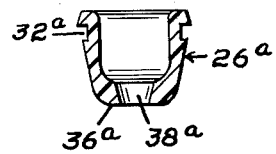
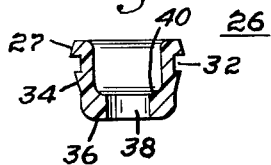
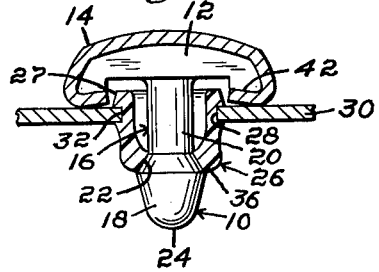
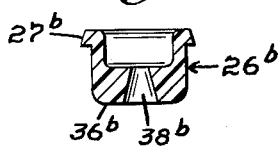
Inventor:
Heinrich Overhoff,
by Gordon Needleman
Atty.

3,262,168
PLASTIC MOLDING FASTENER
Heinrich Overhoff, Loerrach, Baden, Germany, assignor to A. Raymond, Baden, Germany, a firm
Filed July 29, 1964, Ser. No. 386,814
Claims priority, application Germany, Nov. 7, 1963, R 36,518
2 Claims. (Cl. 24—73)

This invention relates generally to fastening devices and more specifically to molding fasteners.

An object of the present invention is to provide a two-part fastener wherein the bulbous head of one part changes the direction that a surface of the other part originally had.

A further object of the present invention is to provide a two-part fastener wherein one part is formed of material having different degrees of hardness and elasticity than the other part.

A still further object of the invention is to provide a two-part fastener wherein the socket element has a narrow end to be spread elastically by the bulbous element whereby the end produces a surface corresponding to an inclined surface on the bulbous element.

Other objects of the invention will, in part, be obvious, and will, in part, appear hereinafter.

An important feature of the fastener arrangement is that the two parts collaborate like a snap fastener. Furthermore, the stopper or stud and socket are made of materials of different hardness and elasticity relative to each other and in the assembled state the softer, more-elastic part is maintained under longitudinal stress by the harder, less-elastic part. In this regard the socket consists of relatively soft elastic plastic, which engages with the fastening stud, which consists of a relatively hard elastic plastic.

Where small holes are to be engaged and/or where narrow decorative moldings are to be utilized, sockets of the type disclosed by the patent to Perrochat, U.S. 3,110,068 and by the patent to Perrochat, U.S. 3,063,114 have been found to be poorly suited because they cannot go below a minimal size and require a certain hole width. Consequently, one of the goals of the present invention consists in the creation of a socket corresponding to the aforementioned requirements, which, in combination with a bolt or stopper assures the contemplated collaboration.

Further, instead of the stud supporting shoulder surrounded by the circumferential groove opposite the inner side of the socket and the inwardly protruding supporting collar disclosed in the mentioned Perrochat Patent, U.S. 3,110,608, the applicant has provided the lower end of the socket with a suitable arrangement to engage the inclined surface of the shank of the stud. For this purpose it was necessary to lengthen the neck of the stud in such a way that the stud part which carries the bulbous head receives the proper position on engagement. It has been found that for obtaining an increased supporting force and better protection against the stud becoming dislodged from the socket when a unilateral stress is exerted thereon, a socket drawn inwardly at its lower end is the most effective. The narrowing of the socket end obtained in this way is greater than will be necessarily called for by the diameter of the stud neck. In this way an elastic widening of the socket end is obtained at the introduction of the stud by the bulbous head.

The stud supporting surface is reduced by means of the cylindrical or conical inner wall of the drawn-in socket end, which after the introduction of the stud, due to the elastic spreading or widening, distends elastically by such an amount that the end surface produces a conical surface corresponding to the inclined surface of the stud.

This invention will be well understood by reference to the following description of the preferred illustrated embodiment thereof shown by way of example in the accompanying drawings, wherein:

FIG. 1 is a side elevation of the stud;
FIG. 2 is a section of a socket member to be utilized with the stud;
FIG. 3 is a section showing a variation of the socket shown in FIG. 2;
FIG. 4 is a section of a variation of the sockets shown in FIGS. 2 and 3; and
FIG. 5 is a section partly in elevation showing the stud of FIG. 1 engaged to the sacket of FIG. 2 in a support and engaged with a molding.

Referring to FIGS. 1, 2 and 5 there is shown a stud 10 formed of an appropriate plastic having a high degree of hardness, but slightly elastic, and having a head 12 adapted for snap engagement with a trim molding 14 or the like. A shaft 16 extends from the head 12 and includes a bulbous terminal end 18 which defines a neck portion 20 on the shaft 16 between the bulbous terminal end 18 and the head 12. The bulbous terminal end 18 includes a circumferential, obtuse angular surface 22 which faces approximately toward the plane of the head 12. The apex of the bulbous terminal end 18 is formed as a rounded conical point 24.

In FIG. 2 there is shown a cross section of a socket 26 which makes up the second part of the two-part fastener.

The upper end of the socket 26 is made as a flange 27, which on engagement of the socket 26 with an aperture 28 formed in a support 30 will lie adjacent the aperture 28. An external circumferential groove 32 is formed adjacent the flange 27 for a purpose to be set forth hereinafter. The external surface of the socket 26 may be tapered slightly from the base of the groove 32 to a predetermined distance from the terminal end of the socket 26. This tapering provides the surface of the socket 26 with what may be referred to as a rib portion 34. The remaining external surface of the socket 26 has a diameter less than the diameter of the rib portion 34 and also less than the greatest diameter of the flange 27. The extreme terminal end of the socket 26 may be again tapered slightly toward the axis thereof to act as a lead in. A base portion 36 is provided, at the other open end of the socket from the flange 27, which partially closes the through hole 38. The base portion 36 and the upper portion of the inner wall of the socket 26 form a shoulder 40. The internal wall of the base portion 36 which defines the through hole 38 has a height greater than the thickness of the flange 27 and substantially equal the length of the surface 22 on the stud 10.

The variation of the socket shown in FIG. 3 and numbered 26a is similar in most respects to the socket 26 as shown in FIG. 2 except that the external wall is tapered all the way from the base of the circumferential groove 32a to the terminal end of the socket and its through hole 38a defines a truncated cone whose theoretic apex would be directed away from the base portion 36a.

As to the variation of the socket shown in FIG. 4 and numbered 26b, the external wall is straight from the lower or under surface of its flange 26b; its base portion 36b is comparatively thick when compared with the socket 26 or the socket 26a, and its through hole 38b defines a truncated cone whose theoretic apex is directed at the plane of the flange 27b.

To engage the stud 10 with the socket 26 of the apertured support 30 along with the molding strip 14, the socket 26 is passed into the aperture 28 until the wall of the aperture 28 snaps into the groove 32. The head 12 of the stud 10 is snapped into engagement with the molding strip 14 with the peripheral extensions 42 which extend from the periphery of the head 10 in superposed abutting relationship with the turned under flanges as shown in FIG. 5. The stud 10 in combination with the molding strip 14 is engaged with the socket 26 and the support 30 by passing the bulbous terminal end 18 of the bulb 10 into the socket 26 until the rounded conical point 24 engages within the through hole 38. Since the knuckle provided by the bulbous terminal end 18 has a diameter greater than the diameter of the through hole 38 the lower portion of the socket is stretched outwardly away from the socket 26 and the wall of the through hole 38 is angled away from the support 30 into abutting engagement with the diagonal surface 22 of the terminal end 18, as shown in FIG. 5.

The sockets disclosed in FIGS. 3 and 4 operate in pretty much the same way as that disclosed for the socket in FIG. 2 except the movement of the base portion 36 varies slightly depending on the configuration of the through hole 38. For example in FIG. 3 the wall of the through hole 38a would start its change of direction somewhat later than the socket shown in FIG. 2; also the configuration of the through hole 38a provides a lead in. In the socket shown in FIG. 4 greater resistance to the passage of the bulbous terminal end 18 is occasioned and a snap back action occurs since the angularity of the wall of the through hole 38b is already in proper position.

Since certain other obvious modifications may be made in this device without departing from the scope of the invention, it is intended that all matters contained herein be interpreted in an illustrative and not in a limiting sense.

What is claimed is:
1. A fastener assembly for attaching an article of manufacture to an apertured support comprising a stud element and a socket element, said stud element including a head portion and a shank extending from said head portion, said shank having a bulbous, free terminal end including an obtuse angular surface directed towards the plane of said head portion, said socket element being formed of a flexible material and including a continuous, uninterrupted, tubular, upstanding body portion having a relatively large opening at one end and a flange extending outwardly therefrom adjacent said end, and a base portion extending into the area defined by said body portion, said base portion having an internal wall defining a smaller opening adjacent the other end of said body portion, said wall having a height greater than the thickness of said flange and substantially equal to the length of the angularly extending surface on the bulbous end of said stud shank, said second opening having a diameter smaller than the greatest external diameter of said bulbous end whereby on axial insertion of said shank through said smaller opening said base portion will be flexed outwardly and said internal wall will mate with the angularly disposed surface in flush, abutting relationship.

2. A fastener assembly according to claim 1 wherein the internal wall of said base portion defines an imaginary truncated cone.

References Cited by the Examiner
UNITED STATES PATENTS

| | | | |
|---|---|---|---|
| 3,033,624 | 5/1962 | Biesecker | 85—82 X |
| 3,063,114 | 11/1962 | Perrochat | 24—73 |
| 3,116,528 | 1/1964 | Poe | 85—84 |
| 3,147,525 | 9/1964 | Texier | 24—73 |

FOREIGN PATENTS 788,742  1/1958  Great Britain.

WILLIAM FELDMAN, *Primary Examiner.*
E. SIMONSEN, *Assistant Examiner.*